US010252441B2

(12) United States Patent
Brown et al.

(10) Patent No.: US 10,252,441 B2
(45) Date of Patent: Apr. 9, 2019

(54) SYSTEM AND METHOD FOR CUTTING A WET GREEN CERAMIC ARTICLE

(71) Applicant: Corning Incorporated, Corning, NY (US)

(72) Inventors: Jason Nelson Brown, Corning, NY (US); John Christian Duroe, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 1481 days.

(21) Appl. No.: 14/011,980

(22) Filed: Aug. 28, 2013

(65) Prior Publication Data

US 2015/0066190 A1 Mar. 5, 2015

(51) Int. Cl.
*B23D 45/24* (2006.01)
*B23D 25/06* (2006.01)
(Continued)

(52) U.S. Cl.
CPC ............... *B28B 11/12* (2013.01); *B26D 1/10* (2013.01); *B26D 5/00* (2013.01); *B26D 5/02* (2013.01);
(Continued)

(58) Field of Classification Search
CPC ........... Y10T 74/18304; Y10T 74/1692; Y10T 74/18336; Y10T 83/4749; F16H 23/02; F16H 23/10; F16H 21/06; F16H 21/08; F16H 21/40; F16H 21/42; F16H 21/52; F16H 25/16; B23D 25/06; B23D 45/24; B26D 1/26; B26D 5/12; B26D 5/14; B28B 11/12; B28B 11/125
(Continued)

(56) References Cited

U.S. PATENT DOCUMENTS 1,957,359 A * 5/1934 Schipper, Jr. ......... F16D 41/088
192/48.1
4,171,648 A * 10/1979 Manzoni ................. B60R 1/064
359/873
(Continued)

FOREIGN PATENT DOCUMENTS

CN 1277909 A 12/2000
DE 202004004815 7/2004
(Continued)

OTHER PUBLICATIONS

English Translation of CN201480058883.X First Office Action dated Feb. 21, 2017, China Patent Office.
(Continued)

*Primary Examiner* — Evan Macfarlane

(57) ABSTRACT

A system for cutting a wet green ceramic article which includes a power device to generate power and a transmission assembly including an input and an output. The input is operably coupled to the power device such that power is transferred through the transmission assembly from the input to the output. The system also includes a cutting tool holder that holds a cutting tool. The cutting tool holder is coupled to the output and pivotally coupled to a pivot point. The output of the transmission assembly pivots the cutting tool holder about the pivot point as the cutting tool reciprocates in a cutting motion between a first position and a second position.

12 Claims, 10 Drawing Sheets

(51) Int. Cl.
*B26D 1/26* (2006.01)
*F16H 23/02* (2006.01)
*B28B 11/12* (2006.01)
*B26D 1/10* (2006.01)
*B26D 5/00* (2006.01)
*B26D 5/02* (2006.01)
*B26D 5/12* (2006.01)
*B26D 5/14* (2006.01)
*B26D 7/06* (2006.01)
*B26D 7/08* (2006.01)
*B26D 1/00* (2006.01)

(52) U.S. Cl.
CPC ............... *B26D 5/12* (2013.01); *B26D 5/14* (2013.01); *B26D 7/0608* (2013.01); *B26D 7/086* (2013.01); *B23D 25/06* (2013.01); *B23D 45/24* (2013.01); *B26D 2001/006* (2013.01); *B26D 2001/0013* (2013.01); *F16H 23/02* (2013.01)

(58) Field of Classification Search
USPC .................................................. 30/392–394
See application file for complete search history.

(56) References Cited

U.S. PATENT DOCUMENTS

| | | | |
|---|---|---|---|
| 5,237,884 A * | 8/1993 | Seto | B27B 19/006 30/166.3 |
| 5,694,870 A | 12/1997 | Morgulis et al. | |
| 5,868,208 A | 2/1999 | Peisert et al. | 173/178 |
| 6,099,397 A | 8/2000 | Wurst | 451/344 |
| 6,190,095 B1 | 2/2001 | Schmidt | |
| 6,412,378 B1 | 7/2002 | Borel | |
| 6,413,895 B1 | 7/2002 | Merkel et al. | 501/106 |
| 6,602,073 B2 | 8/2003 | Schilling et al. | 433/117 |
| 6,771,861 B2 | 8/2004 | Wagner et al. | 385/100 |
| 7,108,077 B2 | 9/2006 | Zaiser | 173/48 |
| 7,157,833 B2 | 1/2007 | Hess | 310/323.18 |
| 7,344,435 B2 | 3/2008 | Pollak et al. | 451/342 |
| 7,743,804 B2 | 6/2010 | Thomaschewski | 144/154.5 |
| 7,922,720 B2 | 4/2011 | May et al. | 606/80 |
| 8,365,419 B2 | 2/2013 | Bernardi et al. | 30/371 |
| 2004/0147934 A1 | 7/2004 | Keister | 606/80 |
| 2006/0080844 A1 | 4/2006 | Bauhuber | 30/272.1 |
| 2006/0231787 A1* | 10/2006 | Varriale | F16J 15/50 251/213 |
| 2009/0137382 A1 | 5/2009 | Merkel et al. | 502/60 |
| 2009/0143221 A1 | 6/2009 | Ogunwumi et al. | 502/67 |
| 2010/0288092 A1 | 11/2010 | Manger et al. | 83/13 |
| 2011/0034943 A1 | 2/2011 | Churchill et al. | 606/171 |
| 2011/0146428 A1* | 6/2011 | Sun | F16H 23/02 74/60 |
| 2013/0037290 A1 | 2/2013 | Clabunde | 173/162.1 |
| 2013/0152757 A1 | 6/2013 | Nakai et al. | |
| 2013/0195659 A1* | 8/2013 | Wade | B64C 33/02 416/79 |

FOREIGN PATENT DOCUMENTS

| | | |
|---|---|---|
| EP | 0372376 | 5/1993 |
| EP | 2319816 A1 | 8/2009 |
| EP | 2402295 A1 | 2/2010 |
| EP | 2163355 | 3/2010 |
| EP | 1428625 | 6/2010 |
| EP | 2266932 A1 | 12/2010 |
| JP | 2001001330 A | 1/2001 |
| JP | 03274027 B2 | 4/2002 |
| JP | 2002321188 A | 11/2002 |
| JP | 2003040691 | 2/2003 |
| JP | 2010228935 A | 3/2009 |
| JP | 2012188346 A | 10/2012 |
| WO | 2013/046541 | 4/2013 |

OTHER PUBLICATIONS

EP2163355—machine translation.
EP1428625—machine translation.
EP0372376—machine translation.
International Search Report of the International Searching Authority; PCT/US2014/052806; dated Nov. 10, 2014; 4 pages; European Patent Office.
English Translation of JP2016537789 Office Action dated Jan. 23, 2018, Japan Patent Office, 5 Pgs.

* cited by examiner

SYSTEM AND METHOD FOR CUTTING A WET GREEN CERAMIC ARTICLE

FIELD OF THE DISCLOSURE

The present disclosure relates to a system and method for forming an extruded body, and in particular to a system and method for cutting a wet green ceramic article to form the extruded body.

BACKGROUND

The extrusion of plasticized material mixtures into cellular structures (i.e., honeycomb) requires a delicate balance of deformability (for shape molding) and structural integrity (for shape retention). Such mixtures can include inorganic ceramic powders, a binder component and a liquid component, the amounts of which are controlled to maintain low pressure, torque, and temperature during the extrusion process while creating a self-supporting body which is able to be handled upon formation. The cellular structure of the extrudate can be formed such that cells near the periphery of the formed body can have a smaller or reduced cross-section compared to cells near the middle or center of the body. In an ideal or pristine cellular structure, pressure equilibrium is achieved between the internal pressure of each cell and the ambient or atmospheric pressure outside the body.

SUMMARY

In one embodiment of the present disclosure, a system is provided for cutting a wet green ceramic article. The system includes a power device to generate power and a transmission assembly including an input and an output. The input is operably coupled to the power device such that power is transferred through the transmission assembly from the input to the output. The system includes a cutting tool holder to hold a cutting tool. The cutting tool holder is coupled to the output and pivotally coupled to a pivot point. The output of the transmission assembly pivots the cutting tool holder about the pivot point and induces the cutting tool to oscillate in a cutting motion between a first position and a second position.

In one example of this embodiment, the cutting tool travels along an arc-like path between the first position and the second position. In a second example, the transmission assembly includes a drive gear rotatably coupled to the power device and a driven gear rotatably coupled to the drive gear. A crankshaft is coupled to and rotatably driven by the driven gear. A connecting rod includes a first end coupled to the crankshaft and a second end coupled to the cutting tool holder, wherein a rotational movement of the crankshaft induces the oscillatory cutting motion of the cutting tool. In a third example of this embodiment, the crankshaft includes a first portion coupled to the driven gear and a second portion coupled to the connecting rod, wherein the first portion is radially offset from the second portion. In a fourth example, the second end is coupled to the cutting tool holder and spaced from the cutting tool by a first distance, and the second end is spaced from the pivot point by a second distance, wherein the second distance is greater than the first distance.

In a fifth example of this embodiment, the transmission assembly includes an input shaft operably coupled to the power device, wherein the input shaft rotates about an input axis. The transmission assembly also includes an output shaft coupled to the cutting tool holder, wherein the output shaft rotates about an output axis. A barrel is rotatably coupled to the input shaft such that the rotation of the input shaft induces substantially concomitant rotation of the barrel about the input axis. The transmission assembly further includes a first push rod coupled to the barrel such that the first push rod rotates in a substantially concomitant manner with the barrel and reciprocally slides in a direction substantially parallel to the input axis. A second push rod is coupled to the barrel such that the second push rod is radially spaced from the first push rod, wherein the second push rod rotates in a substantially concomitant manner with the barrel and reciprocally slides in a direction substantially parallel to the input axis. The transmission assembly includes a housing to at least partially surround the barrel, the first push rod, and the second push rod. The transmission assembly also includes an input plate positioned on one side of the barrel and pivotally coupled to a first pivot. An actuator is provided to pivotally move the input plate about the first pivot to a desired angle. The transmission assembly further includes an output plate positioned on an opposite side of the barrel, wherein the output plate is pivotally coupled to a second pivot. A pivotal movement of the input plate induces a corresponding substantially linear movement of the first push rod and second push rod, and the substantially linear movement of the first push rod and second push rod induces a corresponding pivotal movement of the second plate.

In a sixth example, the oscillatory motion of the cutting tool includes an amplitude and a frequency, wherein the amplitude is adjustably controllable based on the angle at which the input plate is disposed and the frequency is adjustably controllable based on the rotational speed of the barrel. In a seventh example, as the barrel rotates about the input axis, the cutting tool pivots about the output shaft between the first position and the second position.

In a second embodiment of the disclosure, a method is provided for cutting a wet green ceramic article. The method includes providing a power device, a transmission assembly including an input and an output, and a cutting tool coupled to the output. The method further includes producing power by the power device to drive the input and rotating the input of the transmission assembly at a rotational speed. The method also includes transferring the power from the input to the output and pivoting the cutting tool about a pivot. In addition, the method includes moving the cutting tool in an oscillatory motion between a first position and a second position and cutting the wet green ceramic article with the cutting tool.

In one example of this embodiment, the method includes controlling an amplitude of the oscillatory motion by pivoting the input to a desired angle and controlling a frequency of the reciprocating motion by adjusting the rotational speed of the input. In a second example, the method includes rotating an input gear at the rotational speed and rotating an output gear about a rotation axis at an output speed, wherein the output speed is characterized by a ratio of the input gear and output gear. In this example, the method also includes rotating a crankshaft about the rotation axis and reciprocally moving a connecting rod in a substantially linear motion between an extended position and a retracted position. In a third example, the method includes oscillating the cutting tool in an arc-like path between the first position and the second position.

In a fourth example of this embodiment, the method includes providing a barrel, a first push rod, a second push rod, an input plate, and an output plate. The method also includes rotating the barrel, the first push rod, and the second push rod at the rotational speed about an input axis and pivoting the input plate from a substantially vertical orientation to a desired angle. The method further includes moving the first push rod and the second push rod in a direction substantially parallel to the input axis, pivoting the output plate from a substantially vertical orientation to approximately the desired angle, and oscillating the output about the pivot. In a fifth example, the method includes adjusting the desired angle of the input plate to achieve a desired amplitude of the oscillatory motion of the cutting tool and adjusting the rotational speed of the barrel to achieve a desired frequency of the oscillatory motion of the cutting tool.

In another embodiment, a system is provided for cutting a wet green ceramic article. The system includes a power device for generating power and an input shaft operably coupled to the power device, wherein the input shaft is configured to rotate about an input axis. The system includes an output shaft configured to rotate about an output axis and a barrel rotatably coupled to the input shaft such that rotation of the input shaft induces substantially concomitant rotation of the barrel about the input axis. A first push rod is coupled to the barrel, wherein the first push rod rotates in a substantially concomitant manner with the barrel and slides in a direction substantially parallel to the input axis. A second push rod is coupled to the barrel such that the second push rod is radially spaced from the first push rod, wherein the second push rod rotates in a substantially concomitant manner with the barrel and slides in a direction substantially parallel to the input axis. The system further includes an input plate positioned on one side of the barrel such that the input plate is pivotally coupled to a first pivot. An output plate is positioned on an opposite side of the barrel such that the output plate is pivotally coupled to a second pivot. The system also includes a cutting tool pivotably coupled to the output shaft, wherein the cutting tool oscillates between a first position and a second position as the output plate reciprocally pivots about the second pivot. A pivotal movement of the input plate about the first pivot induces a substantially linear movement of the first push rod and second push rod, and the substantially linear movement of the first push rod and the second push rod induces a pivotal movement of the output plate about the second pivot.

In one example, the pivotal movement of the output plate induces oscillatory rotation of the output shaft about the output axis. In a second example, the system includes an input damper and an output damper, wherein the input damper is adapted to bias the input plate to a substantially vertical orientation and the output damper is adapted to bias the output plate to a substantially vertical orientation. In a third example, the oscillatory motion of the cutting tool includes an amplitude and a frequency, wherein the amplitude is adjustably controllable based on the angle at which the input plate is disposed and the frequency is adjustably controllable based on the rotational speed of the barrel.

In a fourth example, when the input plate is disposed in a substantially perpendicular orientation to the input axis, the first push rod and second push rod do not contact either the input plate or output plate. In a fifth example, the system includes an actuator including a member being movable between an extended position and a retracted position, wherein a movement of the member induces pivotal movement of the input plate about the first pivot. The system also includes a control system to control the power device and the actuator, wherein the control system adjustably controls the movement of the member to pivot the input plate to a desired angle.

BRIEF DESCRIPTION OF THE DRAWINGS

The above-mentioned aspects of the present disclosure and the manner of obtaining them will become more apparent and the claimed disclosure itself will be better understood by reference to the following description of exemplary embodiments, taken in conjunction with the accompanying drawings, wherein:

Corresponding reference numerals are used to indicate corresponding parts throughout the several views.

DETAILED DESCRIPTION

Figure 1:
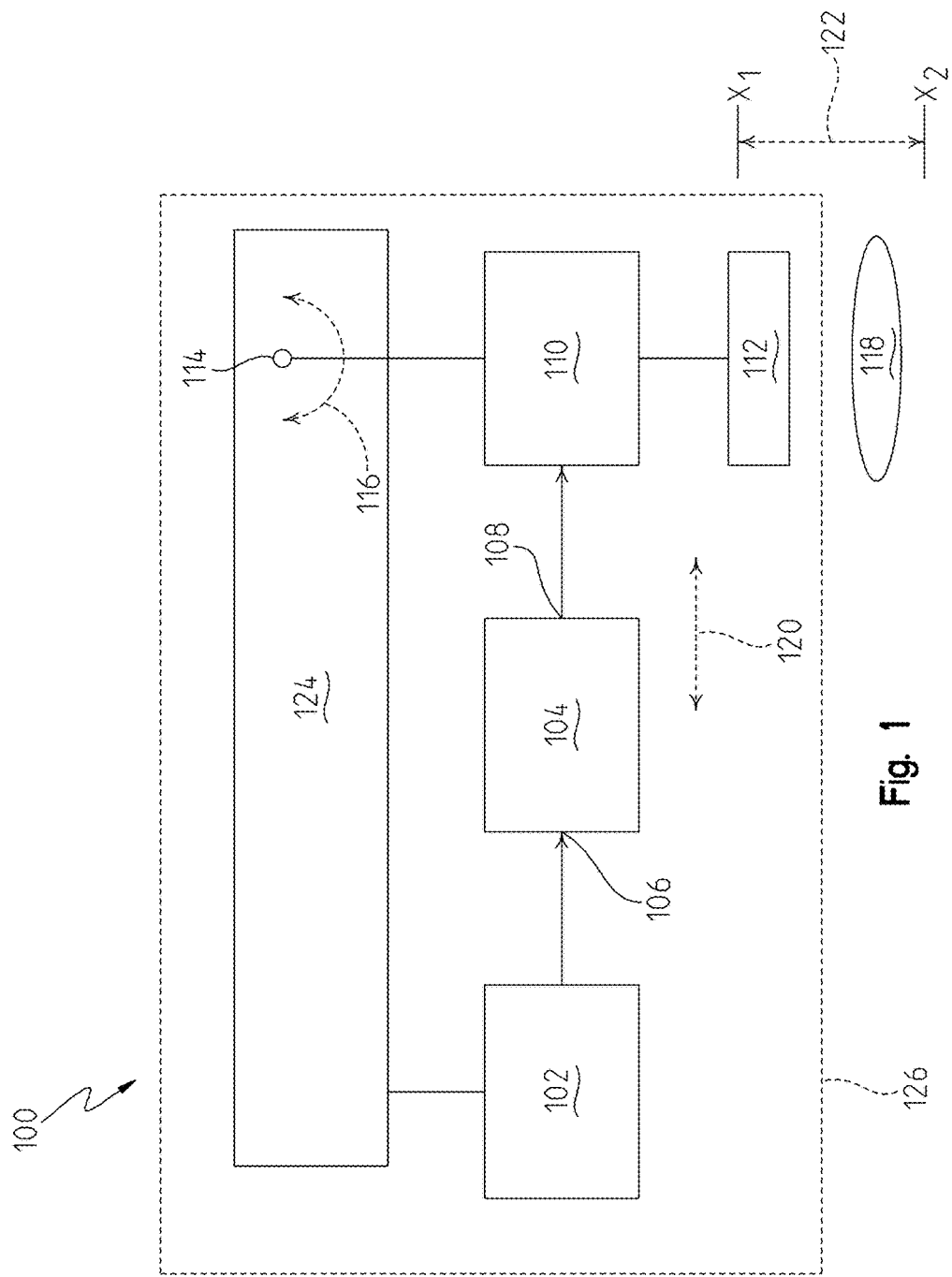
FIG. 1 is a simplified schematic of a system for cutting a wet green ceramic article.

The embodiments described below are not intended to be exhaustive or to limit the disclosure to the precise forms disclosed in the following detailed description. Rather, the embodiments are chosen and described so that others skilled in the art may appreciate and understand the principles and practices of the disclosure as claimed herein.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the present disclosure, different embodiments are provided of a method and system for cutting a material as it is extruded through an extrusion process. The material can include any plastically deformable material which is capable of being molded and shaped by extrusion. Such materials can include mixtures of inorganic powders (i.e., ceramic raw materials) and organic forming compounds (i.e., binders, surfactants, plasticizers, lubricants, and the like). Other examples of suitable plastic materials can include mixtures capable of forming ceramic articles which contain cordierite and/or mullite. Examples of such mixtures can include 2% to 60% mullite, and 30% to 97% cordierite, with allowance for other phases, typically up to 10% by weight. Suitable binders for cordierite formation which have a thermal gel point are cellulose ether binders, such as methylcellulose, and/or methylcellulose derivatives.

Ceramic raw materials, binder and remaining organic components can be mixed with a liquid vehicle, such as water, to form a plasticized batch. During the extrusion process, the batch can enter an extruder and be extruded through a die. Extruders are well known in the art, and can comprise a ram or a screw feed that forces the material through the die. As the ceramic material leaves the extruder die it is in the shape of a long tubular mass, referred to as a wet green ceramic article which is then cut to shape using a cutting tool such as a blade. The wet green ceramic article may be further processed after cutting, such as dried, skinned, plugged, or contoured. The article may also be fired to form a ceramic body, such as to form a filter, substrate, or honeycomb-like structure. As one non-limiting example, the ceramic material may include aluminum titanate, but this disclosure is intended to cover any wet green ceramic article.

During the extrusion process, the blade can "smear" or collapse the more delicate outer cells of the article. This can be particularly true of materials having denser composition. Material having a denser composition tends to be more susceptible to smearing or collapsing during the cutting step. Besides causing surface defects and the like to the article, conventional cutting processes can also require frequent blade changes, which increases the loss of material utilization. The frequent blade changes can reduce productivity of the overall extrusion process as well.

Referring to FIG. 1, one embodiment of a system 100 for cutting a wet green ceramic article 118 is shown. The system 100 can include a power device 102, a transmission assembly 104, a cutting tool holder 110, and a cutting tool 112. In a broad sense, the power device 102 can include any device that is capable of generating power. This may include, for example, an electric motor (AC or DC), a hydraulic motor, a gas engine, a diesel engine, a power generator, or any other known power-generating device.

In this embodiment, the power device 102 is any conventional apparatus, device, or machine that is capable of providing power to an input 106 of the transmission assembly 104. In this manner, power that is received at the input 106 of the transmission assembly 104 is transferred therethrough to an output 108 of the transmission assembly 104. The transmission assembly 104 can include one or more of gears, plates, clutches, hubs, drums, bearings, shafts, sheaths, belts, chains, sprockets, rods, and the like. The transmission assembly 104 can be designed such that the amount of power received at the input 106 is approximately the same as the amount of power received at the output 108. In other aspects, however, the transmission assembly 104 may include losses, such as due to friction, heat, etc., and thus the power received at the output 108 may be less than that received at the input 106.

In any event, the amount of power received at the output 108 of the transmission assembly 104 can be used to drive the cutting tool holder 110 and cutting tool 112. As shown in FIG. 1, the cutting tool holder 110 can be coupled to the output 108 of the transmission assembly 104. In addition, the cutting tool holder 110 can be coupled at a different location to a pivot point 114. The output 108 of the transmission assembly 104 can reciprocally move in a substantially axial direction 120 as shown in FIG. 1. As the output 108 imparts this substantially axial movement on the cutting tool holder 110, the cutting tool holder 110 can pivot about the pivot point 114 along an arc-like path 116.

As the cutting tool 112 travels along this arc-like path 116, it can also move in a substantially longitudinal direction 122 (i.e., a cutting direction) as shown in FIG. 1. As the cutting tool 112 moves in the substantially longitudinal direction 122, it can contact and separate the material 118 during the cutting motion. Moreover, the cutting tool 112 can travel along the substantially longitudinal direction 122 between one position $X_1$ and another position $X_2$. The blade or cutting speed can be defined by the length of time it takes the cutting tool 112 to travel between position $X_1$ and position $X_2$ (i.e., $\Delta X/\Delta t$, where $\Delta X$ refers to the distance between $X_1$ and $X_2$ and $\Delta t$ refers to the time it takes the cutting tool 112 to travel this distance).

The cutting tool holder 110 can also be coupled to the cutting tool 112 as shown in FIG. 1. The cutting tool 112 can be any conventional band saw that includes a blade. In one, non-limiting example, the cutting tool can be made from ½" wide, 0.020" thick band material ground with a double-scalloped and double-beveled blade. As the cutting tool holder 110 pivots about the pivot point 114, the pivotal movement of the cutting tool holder 110 causes the cutting tool 112 to move in an oscillatory, cutting motion as defined by direction 116.

The aforementioned cutting motion causes the cutting tool 112 to swing or move in the arc-like path 116 through the material 118 in two directions. Referring to FIG. 1, the cutting tool 112 is shown in a first position substantially aligned vertically with respect to the pivot point 114. However, as the cutting tool holder 110 pivots relative to the pivot point 114 in a counterclockwise direction, the cutting tool 112 also moves in a substantially concomitant arc-like path 116 relative to the pivot point 114 from the first position to a second position which is angularly disposed from the first position in the counterclockwise direction. Likewise, as the cutting tool holder 110 pivots about the pivot point 114 in a clockwise direction, the cutting tool 112 moves in the arc-like path 116 to a third position which is angularly disposed from the first position. The angle or arc-like path 116 between the first position and the second position can be approximately the same as the angle or arc-like path 116 between the first position and the third position. This is further addressed below with reference to FIG. 9.

In FIG. 1, as the cutting tool 112 moves from the second position to the third position (i.e., a cutting motion in the clockwise direction), the cutting tool 112 contacts the material 118 and imparts a cutting force on the material in the direction of which the cutting tool 112 moves. For instance, as the blade first contacts the material 118 it imparts a downward cutting force on the material 118 and a first lateral cutting force in the direction in which the blade moves through the material 118 (e.g., right-to-left). As the blade passes through and moves out of contact with the material 118, however, it also imparts a cutting force in a direction opposite the downward force. Once the cutting tool 112 reaches the third position, it can then move from the third position to the second position (i.e., a cutting motion in the counterclockwise direction). In doing so, the cutting tool 112 contacts the material 118 and imparts an initial downward cutting force upon contact with the material 118 and a second lateral cutting force direction in the opposite direction (e.g., left-to-right). As the blade passes through and moves out of contact with the material 118 towards the second position, the blade also imparts a cutting force in a direction opposite the downward force. This bi-directional cutting motion provides non-directional drag force to the surface of the material 118 and reduces cutting defects such as face smear.

In the embodiment of FIG. 1, the system 100 can also incorporate a low amplitude, high frequency cutting along the length of the blade 112. To do so, blade vibration can be induced to further facilitate the separation of material 118 and reduce blade contact with the material 118. In effect, the system 100 can achieve increased blade life and reduced cutting defects in the part being formed. This is further described with respect to the illustrated embodiment of FIG. 2.

As shown in FIG. 1, the power device 102 and pivot point 114 can be coupled to a movable frame 124. The frame 124 can be made of aluminum, for example, or other material for supporting the power device 102 and pivot point 114. The frame 124 is capable of moving in a substantially longitudinal direction 122 as shown in FIG. 1 to allow the cutting tool 112 to cut through the wet green ceramic article 118. The frame 124 can also move in a direction substantially perpendicular to directions 120, 122 (i.e., into and out of the page of FIG. 1). This third direction can also be referred to as an extrusion direction, which corresponds to the direction in which the wet green ceramic article 118 moves as it is extruded from the die and moves toward the cutting system 100. In this arrangement, a portion 126 of the overall system 100 can move as the frame 124 moves.

In one aspect of this embodiment, the cutting tool 112 can move downwardly in direction 122 and cut through a first article 118 and then move upwardly in the opposite direction to cut through a subsequent article 118 that is extruded. In a different aspect, the cutting tool 112 can move downwardly in direction 122 and cut through a first article 118 and almost simultaneously move in an upwardly direction before repeating the downward movement for cutting a second article 118. In any event, the frame 124 can move in the extrusion direction at about the same velocity as the article moves (i.e., an extrusion velocity). After the cutting tool 112 cuts a first article 118, the frame 124 can move such that it repositions the cutting tool 112 to a position in which a cutting face of the tool is approximately perpendicular to the extrusion direction. In this manner, the cutting tool 112 is properly positioned to cut a second article 118.

The system 100 of FIG. 1 can further include an automatic blade changing and blade indexing system. Since the cutting tool 112 can be held by the cutting tool holder 110 in a substantially stationary manner, the system 100 can be designed to automatically perform functions such as clamping, tensioning, and indexing for subsequent cutting operations. To do so, the system 100 can include a mechanism (not shown) for decoupling (e.g., unclamping) the cutting tool 112 from the cutting tool holder 110, indexing the cutting tool 112 to a new or desired position, and recoupling the cutting tool 112 to the cutting tool holder 110. The cutting tool 112 may be an elongated band or coil saw (e.g., 100 feet or greater in length), and after a cutting operation the system 100 can be triggered to initiate an automatic blade changing or indexing operation. The system 100 can also be designed to set or adjust a tension in the cutting tool 112. In any event, the automatic blade changing and indexing system can reduce material waste and improve the system's performance over many conventional cutting systems.

Figure 2:
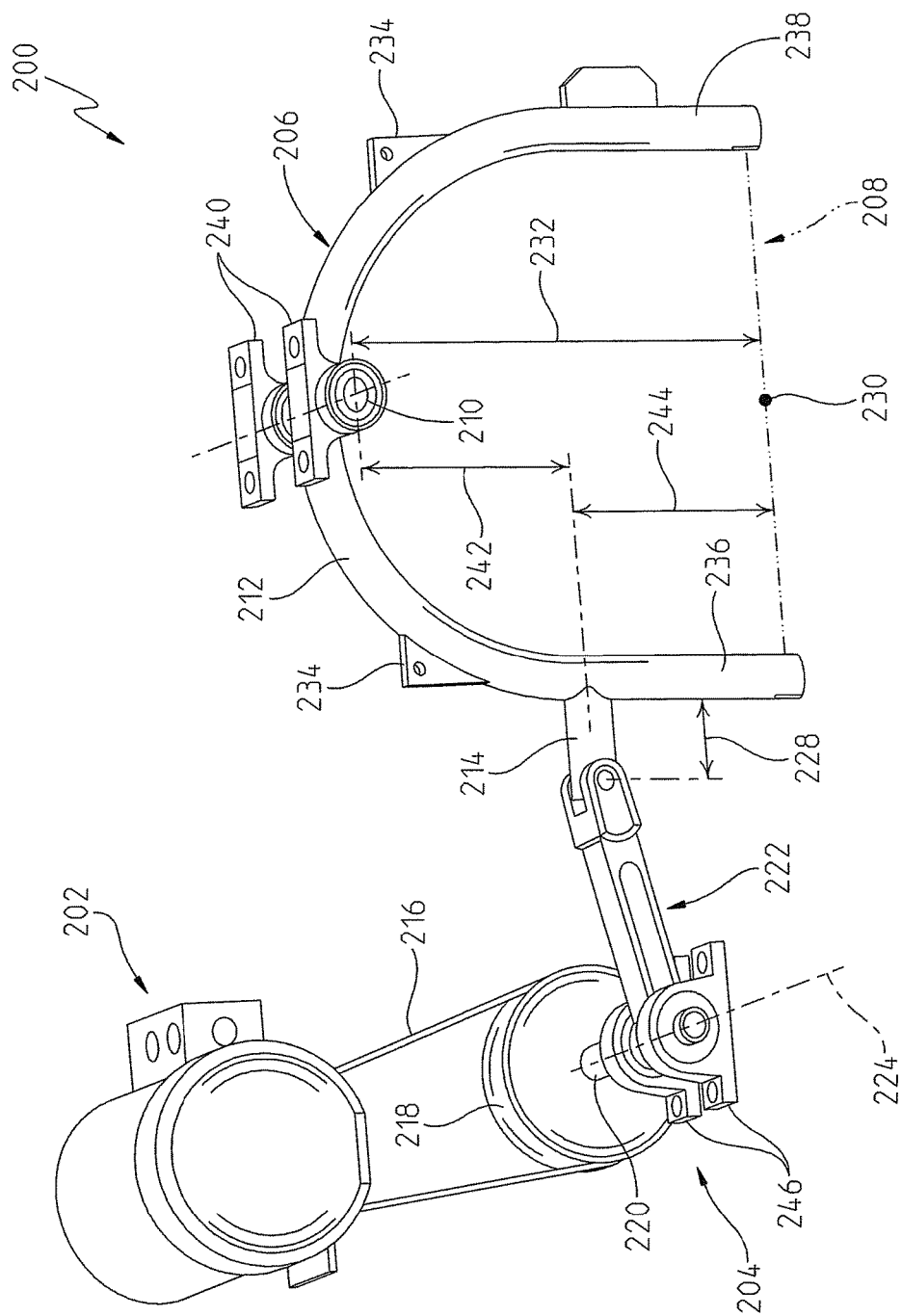
FIG. 2 is a perspective view of one embodiment of a system for cutting a wet green ceramic article.

Referring to FIG. 2, another embodiment of a system 200 for cutting a wet green ceramic article is shown. The system 200 can include a power device 202 similar to the power device 102 of FIG. 1. In one example, the power device 202 can include a 2-hp electric motor that has an output shaft (not shown) for driving a V-belt 216. Although not shown, a drive gear may be coupled to the output shaft (not shown) and the V-belt 216 further coupled to the drive gear. Moreover, the V-belt 216 can be tensioned between the drive gear and a driven gear 218. In this manner, the V-belt 216 and driven gear 218 can form part of a transmission assembly 204 of the system 200. In other aspects, the V-belt 216 can be a chain, a rope, or other mechanism for transferring power from the power device 202 to the driven gear 218. The driven gear 218 may also be a sheath, a wheel, a sprocket, or other device for receiving power through the V-belt 216. In one non-limiting example, the driven gear 218 can be a flywheel. In any event, the driven gear 218 can be sized to reduce reciprocating forces caused by the power device 202 in the system 200.

Figure 3:
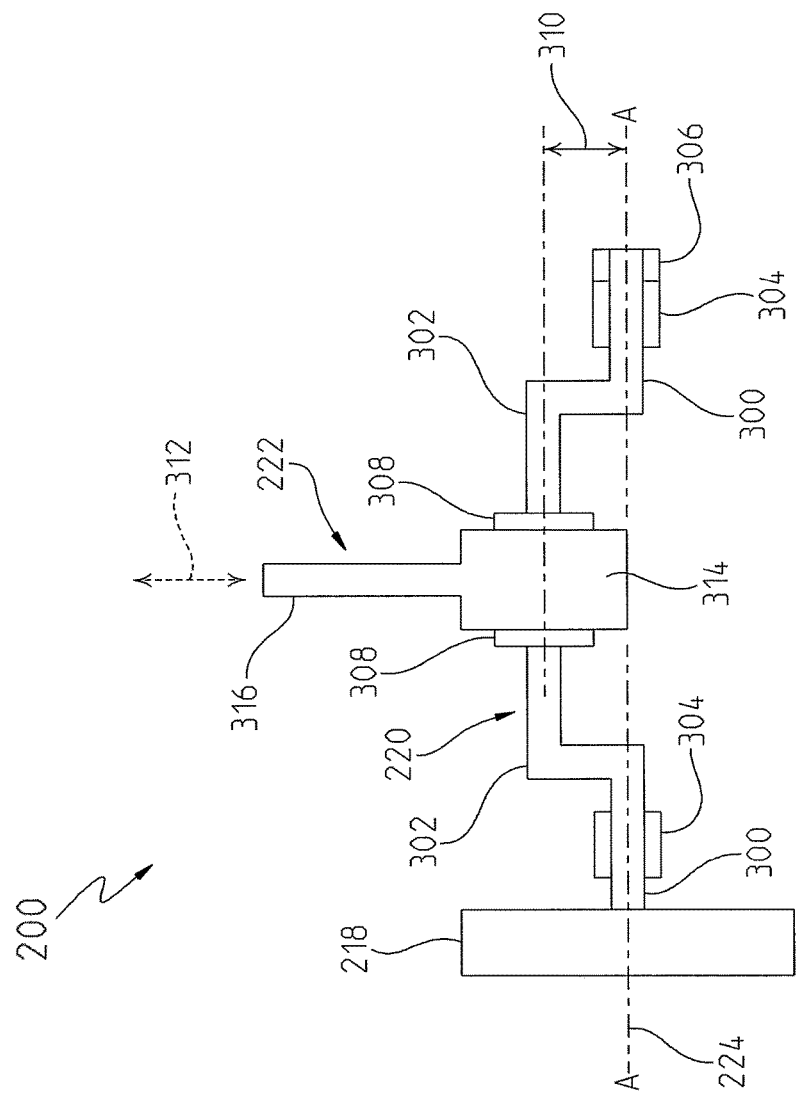
FIG. 3 is a simplified schematic of a transmission assembly of the system of FIG. 2.

Referring to FIGS. 2 and 3, the driven gear 218 can be structured to drive a crankshaft 220 about a main rotation axis A. The main rotation axis A is also shown as an input axis 224 of the transmission assembly 204 in FIG. 2. The crankshaft 220 can be supported by a first set of lubricating bearings 304 and a second set of lubricating bearings 308. An end cap or fixture 306 can be positioned on the end of the crankshaft 220 opposite the driven wheel 218 (see FIG. 3). The crankshaft 220 can include a first portion 300 and a second portion 302. The first portion 300 and second portion 302 are offset from one another by an offset distance 310. In one aspect, the first portion 300 can be axially offset from the second portion 302. In another aspect, the first portion 300 can be radially offset from the second portion 302.

As shown in FIG. 3, the driven gear 218 is coupled to the first portion 300 of the crankshaft 220. In this arrangement, the first portion 300 is positioned along the main rotation axis A, whereas the second portion 302 is offset from the main rotation axis A by the offset distance 310. As shown in FIGS. 2 and 3, a connecting rod 222 can be coupled to the second portion 302 of the crankshaft 220 and positioned between the second set of lubricating bearings 308. The connecting rod 222 can include a first section 314 that is coupled to the second portion 302 of the crankshaft 220. In addition, the connecting rod 222 can include a second elongate section 316 that extends in a direction substantially orthogonal to the main rotation axis A. As the countershaft 220 rotates about the main rotation axis A, the first section 314 of the connecting rod 222 rotates in a substantially concomitant relationship to the second portion 302 of the crankshaft 220.

The second section 316 of the connecting rod 222 can be coupled to a cutting tool holder 206. Here, the rotation of the crankshaft 220 can induce reciprocal movement of the second section 316 of the connecting rod 222 along a substantially linear direction 312. In FIG. 2, the cutting tool holder 206 is provided for holding a cutting tool 208, such as a band saw. The cutting tool holder 206 includes a substantially semicircular body 212 forming a first arm 236 and a second arm 238. The cutting tool holder 206 can further include an extending leg 214 that is coupled to the connecting rod 222. The rotational movement of the connecting rod 222 about the main rotation axis A (i.e., input axis 224) can induce the substantially linear movement of the leg 214 along the reciprocating direction 312.

The cutting tool holder 206 can also include one or more ear tags or ribs 234 for coupling to a dampening system (not shown). The dampening system (not shown) can include one or more springs for reducing vibration in the overall system 200. The cutting tool holder 206 can further include a pair of base members 240 for coupling to a frame (not shown) or the like. Similarly, the transmission assembly 204 can include a pair of base members 246 for coupling to the frame (e.g., the movable frame 124 shown in FIG. 1).

Similar to the illustrative embodiment of FIG. 1, the cutting tool holder 206 of FIG. 2 can also be pivotally coupled to a pivot point 210. The cutting tool holder 206 is coupled to the pivot point 210 at approximately its center point along its semicircular-like shape. In other words, the distance from the pivot point 210 to the end of the first arm 236 can be about the same as the distance from the pivot point 210 to the end of the second arm 238. In other aspects, however, the cutting tool holder 206 may be coupled at different locations along its body 212 to achieve different cutting motions.

The cutting tool 208 can be coupled to the cutting tool holder 206 at each of the first arm 236 and second arm 238. In this manner, the cutting tool 208 can be coupled, clamped, or otherwise fastened to the cutting tool holder 206 such that a tension is achieved in the cutting tool 208. The tension in the cutting tool 208 can be adjusted to achieve a desired vibration in the cutting tool 208 as it cuts through the material. The amount of vibration in the cutting tool 208 can impact the shape of the formed part. Although not shown, each of the first arm 236 and second arm 238 can include a fastener or mechanism for clamping or coupling the cutting tool 208 thereto to maintain a desired tension. The desired tension can depend on the size and type of material being cut, and can also depend on the design of the cutting tool 208 and cutting tool holder 206. In one non-limiting example, a desirable tension can be set up to 1000 lbs. In another example, a desirable tension can be set up to 600 lbs.

As the power device 202 generates power and the power is transferred through the transmission assembly 204, the connecting rod 222 can reciprocate along direction 312 and thereby pivot the cutting tool holder 206 about the pivot point 210 in an oscillatory motion (e.g., similar to path 116 of FIG. 1). The oscillatory motion of the cutting tool 208 can allow for an increase in blade speed over many conventional cutting systems. In one example, the cutting tool speed can be set up to 50 inches/sec. In another example, the cutting tool speed can reach 60 inches/sec. In a further example, the cutting tool speed can be set not to exceed almost 100 inches/sec. In these examples, the cutting tool speed may only be limited by the design of the system 200 and the type and size of material being cut.

Another aspect of the system 200 is the approach angle of the cutting tool 208 as it approaches and initially contacts the material. The approach angle can be a function of blade displacement and system operating frequency. The frequency of the cutting tool 208 can be defined as a function of the power device output and the ratios of the drive gear and driven gear 218. As the power device 202 output is adjusted, the frequency of the system 200 can also be adjusted. The system operating frequency, for example, can be set between 0-200 Hz. In another example, the frequency may be set between 20-60 Hz. The blade displacement can refer to an amplitude induced in the cutting tool 208 as it oscillates during the cutting motion. The displacement, or amplitude, can be defined as the distance measured from a center point 230 of the cutting tool 208. In FIG. 2, for example, the cutting tool 208 is arranged such that the center point 230 is substantially aligned vertically and spaced by a distance 232 with respect to the pivot point 210.

Figure 9:
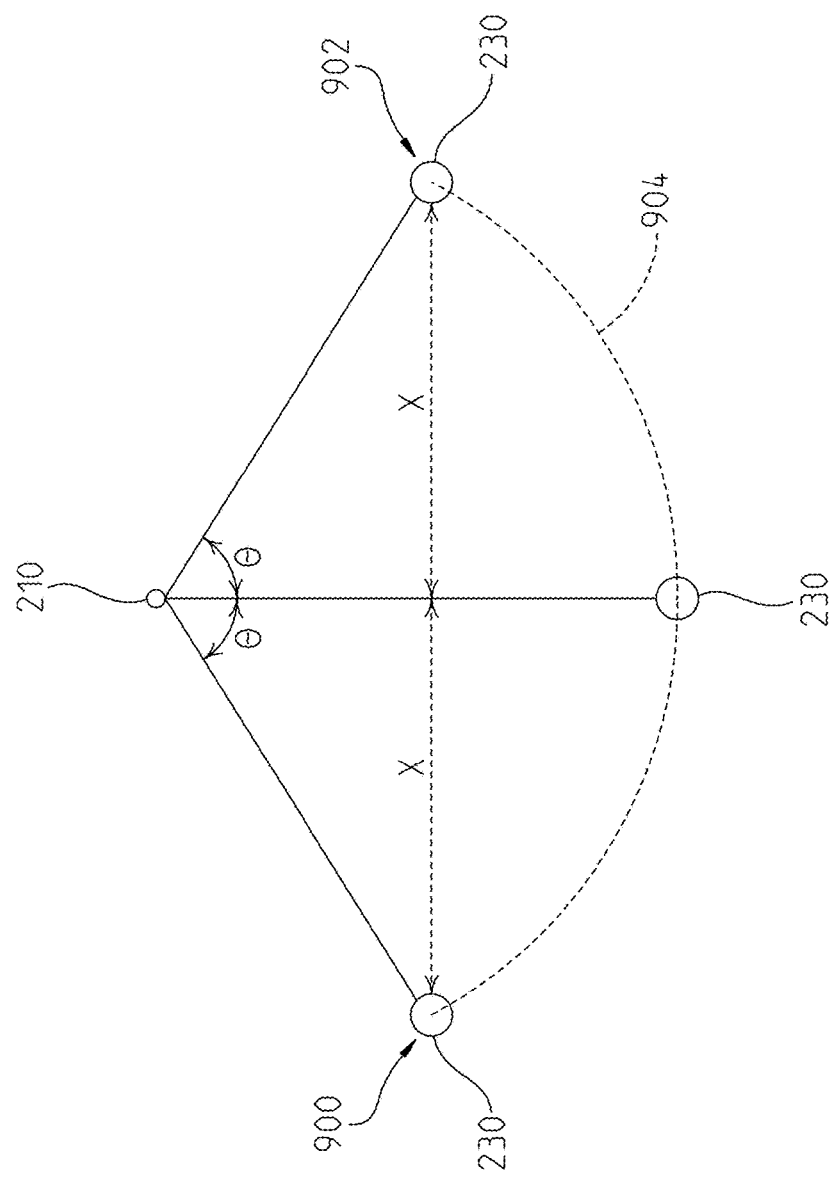
FIG. 9 is a simplified schematic of a cutting motion of a cutting tool.

This is further shown in FIG. 9. As the connecting rod 222 reciprocates along direction 312, the cutting tool holder 206 pivots about the pivot point 210 such that the center point 230 moves along a substantially arc-like path 904 between a first position 900 and a second position 902. For purposes of this description, the first position 900 corresponds to the center point 230 being disposed at a maximum clockwise position (e.g., far left position relative to its position in FIG. 2) and the second position 902 corresponds to the center point 230 being disposed at a maximum counterclockwise position (e.g., far right position relative to its position in FIG. 2). Thus, the position shown in FIG. 2 can represent a center position approximately equidistant between the first and second positions.

As the center point 230 pivots to the first position 900, the center point 230 is disposed at an angle $\Theta$ relative to the center position of FIG. 2. Similarly, as the center point 230 moves to the second position 902, the center point 230 is disposed at about the same angle $\Theta$ relative to the center position of FIG. 2. As further shown, the displacement of the center point 230 is shown by a lateral distance X in FIG. 9 as the cutting tool 208 oscillates between the first and second positions. In one example, the displacement can be up to about 3 inches. In another example, the displacement can be between 0.100 and 1 inch. In yet another example, the displacement can be between 0.100-0.500 inches.

This displacement can be a function or combination of the spacing between the connecting rod 222 and the pivot point 210 and the amount of offset (e.g., distance 310) in the crankshaft 220. The amount of offset, i.e., distance 310, between the first portion 300 and the second portion 302 of the crankshaft 220 can be between 0.075 and 0.175 inches. In another example, the offset distance 310 may be about 0.125 inches. The offset distance 310 can impact the displacement of the cutting tool 208 as it oscillates relative to the pivot point 210. As such, this offset distance 310 also affects the distance traveled by the connecting rod 222 along direction 312.

The connecting rod 222 is spaced from the cutting tool 208 by a first distance 228, which corresponds to approximately the length of the extending leg 214 of the cutting tool holder 206. The connecting rod 222 is spaced from the pivot point 210 by a second distance 242 (see FIG. 2) and the cutting tool 208 by a third distance 244. In the system 200 of FIG. 2, the connecting rod 222 is coupled to the cutting tool holder 206 in closer proximity to the cutting tool 208 than to the pivot point 210 (i.e., the third distance 244 is less than the second distance 242). In this configuration, the offset distance 310 of the crankshaft 220 can be greater as the connecting rod 222 is coupled closer to the cutting tool 208. This can also allow for better control of the cutting tool holder 206 since there is a smaller extending leg (i.e., distance 228) coupling the connecting arm 222 to the cutting tool holder 206 and a smaller distance (i.e., distance 244) between the connecting rod 222 and the cutting tool 208.

The amplitude can be adjusted or changed by replacing the crankshaft 220 with a different crankshaft having a different offset distance 310. Alternatively, the amplitude can be adjusted by changing the location at which the connecting rod 222 couples to the cutting tool holder 206 (i.e., moving the location closer to the cutting tool 208 versus moving the location closer to the pivot point 210). The amplitude may also be changed by placing the driven gear 218 or flywheel closer to the power device 202. Any of the aforementioned adjustments made to the system 200 can reduce inefficiencies in the power device 202 and transmission assembly 204, and therefore provides for a more robust system 200.

The cutting tool 208 can also vibrate along its length as it separates the material during the cutting motion. In one aspect, this vibration can be a function of the stiffness of the first arm 236 and second arm 238 and cutting tool speed. The vibration can be adjusted by changing the cutting tool holder 206 (e.g., with a different stiffness), adjusting the tension in the cutting tool 208, or adjusting the cutting tool speed.

The system 200 of FIG. 2 is only one example of the different mechanisms that may achieve a desired cutting process. While the crankshaft 220 and connecting rod 222 form a drive mechanism for the cutting tool 208 in FIG. 2, other mechanisms can produce desirable outputs including an infinitely variable oscillatory drive mechanism. Cam-based or pulley-based systems may also be incorporated into the system 200 of FIG. 2. In other examples, the system 200 may include a lubrication system for lubricating the bearings and shafts (e.g., crankshaft 220 and connecting rod 222) of the transmission assembly 204. There may also be a control system for controlling the power device 202. The system 200 may include a gearbox or other mechanism for achieving a desired cutting process. Thus, the scope of this disclosure is not limited to the illustrated embodiments shown in FIGS. 2 and 3.

Referring to FIGS. 4-8, a different embodiment of a transmission assembly 400 is shown. The transmission assembly 400 can be incorporated into the system 100 of FIG. 1 or the system 200 of FIG. 2 for transferring power from a power device to a cutting tool. In this embodiment, the transmission assembly 400 can include an input shaft 402 and an output shaft 404. The input shaft 402 defines the input to the transmission assembly 400, whereas the output shaft 404 defines the output from the transmission assembly 400. Thus, the power device 102 of FIG. 1 can be coupled to the input shaft 402 and provide power thereto. The input shaft 402 can be rotatably driven by the power device at a desired speed, and the power can be transferred through the transmission assembly 400 to the output shaft 404 which drives the cutting tool holder 110 and cutting tool 112.

The transmission assembly 400 can include an outer housing 406 that supports and at least partially encloses one or more components of the transmission assembly 400. The housing 406 can form an inner chamber that protects the components from the surrounding environment. Of these components, the transmission assembly 400 can include a barrel 408 that is coupled to and rotatably driven by the input shaft 402. The barrel 408 can be positioned towards the middle or center of the housing 406. At an end nearest the input shaft 402, the transmission assembly can include an input plate 410. On the opposite side of the barrel 408 and towards the output shaft 404 is an output plate 412. As will be described, the input plate 410 and the output plate 412 can be pivotably coupled to a pair of pivot points.

Figure 4:
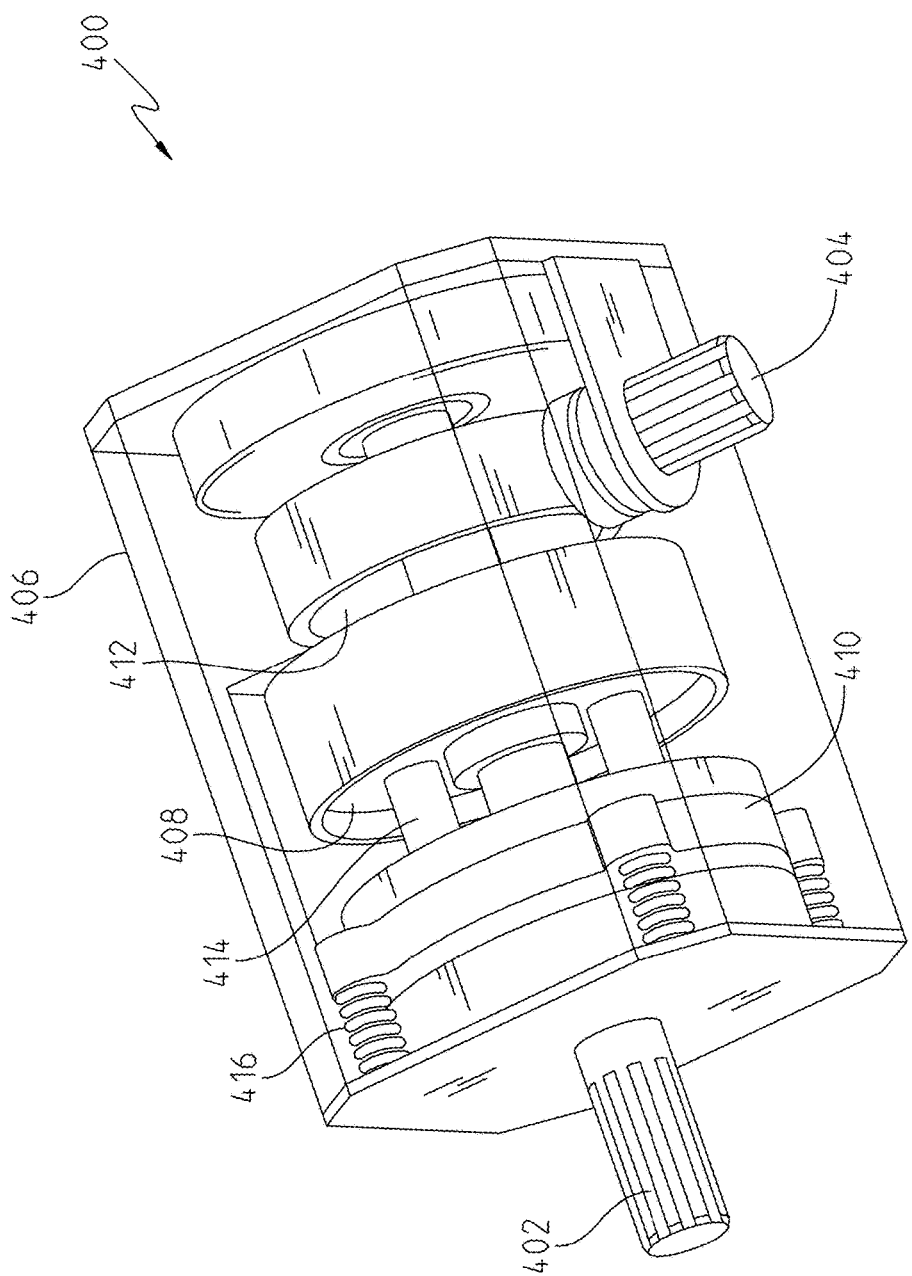
FIG. 4 is a top perspective view of a second embodiment of a transmission assembly.

The transmission assembly 400 can also include a dampening system 416 for reducing vibrations in the system. The dampening system 416 can include one or more springs as shown in FIG. 4. The dampening system 416 can also align the input plate 410 in a substantially upright or vertical orientation. Although not shown in FIG. 4, a similar dampening system can be provided to align the output plate 412 in a substantially upright or vertical orientation.

In FIG. 4, the transmission assembly 400 can further include one or more push rods 414. The one or more push rods 414 can be slidably disposed within the barrel 408 such that the push rods 414 can reciprocally slide longitudinally in a direction substantially parallel to a rotation axis 700 (see FIG. 7) of the input shaft 402. In this manner, the push rods 414 can slide longitudinally into engagement with the input plate 410 and the output plate 412. Moreover, as the barrel 408 rotates, the push rods 414 can rotate in a substantially concomitant relationship with the barrel 408.

Figure 5:
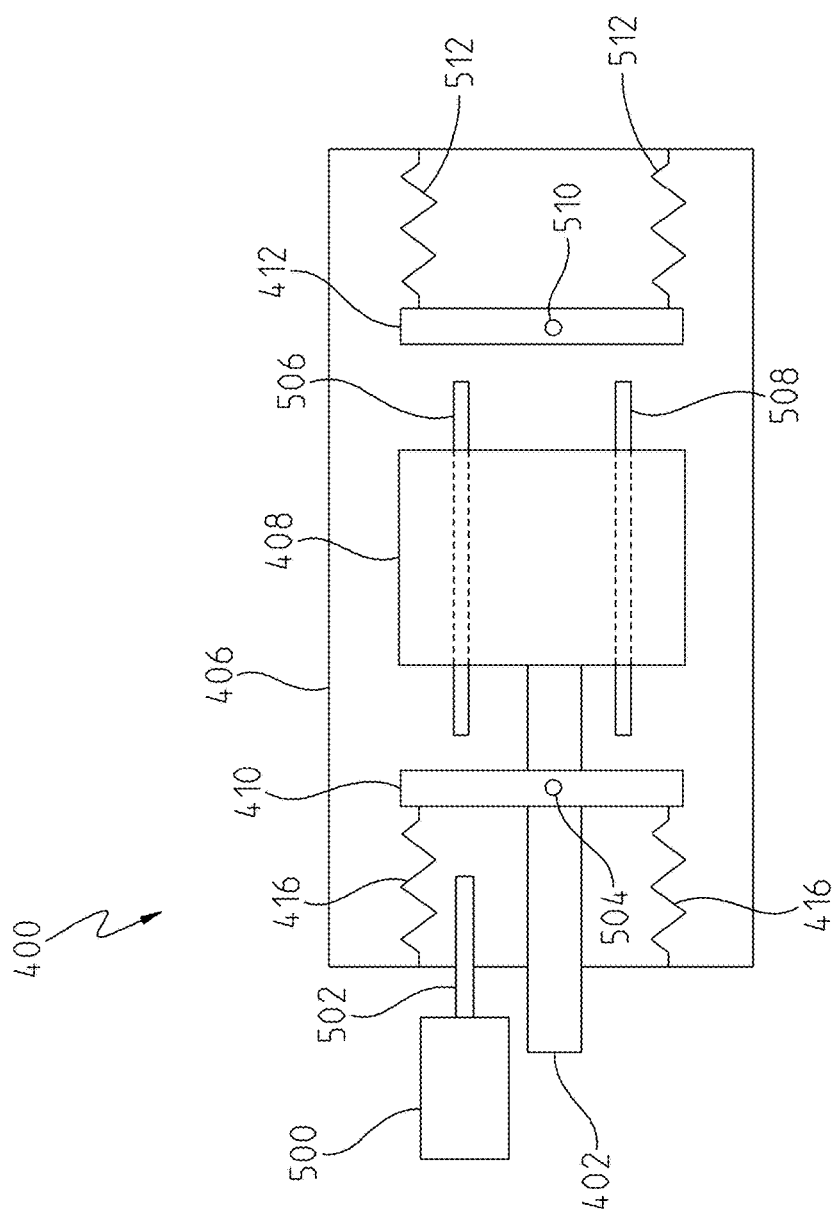
FIG. 5 is a simplified schematic of the transmission assembly of FIG. 4.
Figure 6:
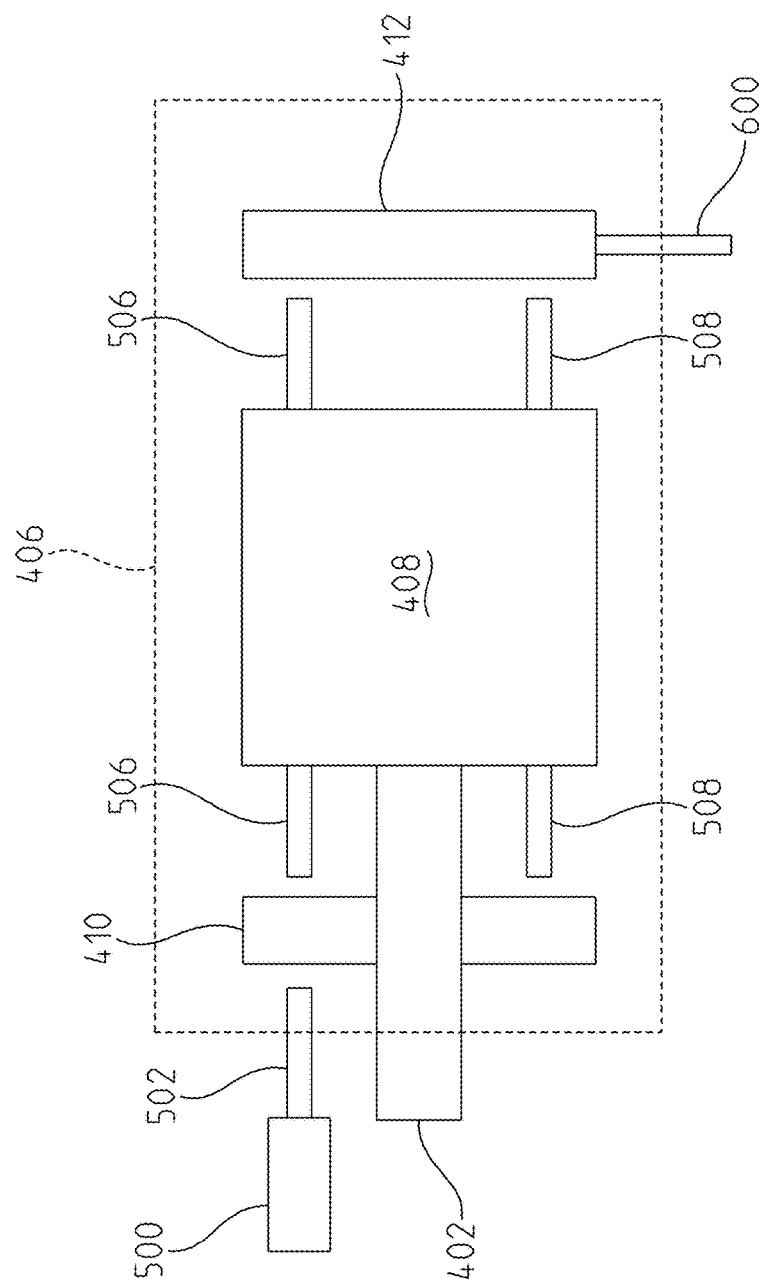
FIG. 6 is a second simplified schematic of the transmission assembly of FIG. 4.

Referring to FIGS. 5 and 6, the input plate 410 can be pivotally coupled to a first pivot 504 and the output plate 412 can be pivotally coupled to a second pivot 510. As will be described, an axis passing through the second pivot 510 corresponds to an output axis along which the output shaft 404 rotates or pivots. In FIG. 5, the input plate 410 and the output plate 412 are shown configured in the substantially upright or vertical orientation. The input damper 416 can be arranged between one end of the housing 406 and the input plate 410 to bias the input plate 410 in this substantially upright or vertical orientation. Likewise, an output damper 512 can be arranged between an opposite end of the housing 406 and the output plate 412 to bias the output plate 412 towards its substantially upright or vertical orientation.

In the embodiment of FIG. 5, the transmission assembly 400 can include a first push rod 506 and a second push rod 508. The first push rod 506 and second push rod 508 can be spaced approximately 180° from one another. While only two push rods are shown in FIG. 5, other embodiments may include additional push rods. For example, if the transmission assembly 400 included three push rods, each push rod may be spaced approximately 120° from one another. Likewise, if there were four push rods, each push rod may be equidistantly spaced by 90°. In the substantially upright or vertical orientation, neither the first push rod 506 nor the second push rod 508 contact the input plate 410 or the output plate 412.

The transmission assembly 400 can further include an actuator 500 having an actuator arm or rod 502 that can extend and retract. The actuator 500 can be any conventional actuator. This can include a hydraulic actuator, an electric actuator, a mechanical actuator, etc. In one example, a hydraulic actuator can be controlled by a hydraulic pump that supplies hydraulic fluid to drive the actuator. In another example, the actuator can be electrically driven. In another example, the actuator 500 can be controlled by a system controller (not shown) to move the rod 502 as desired. The rod 502 can move into contact with the input plate 410 and urge the input plate 410 to pivot about the first pivot 504. As the input plate 410 pivots relative to the first pivot 504, the input plate 410 is angularly disposed relative to the substantially upright or vertical orientation of FIG. 5. As the input plate 410 pivots relative to the first pivot 504, the input plate 410 can come into contact with the first and second push rods.

Figure 7:
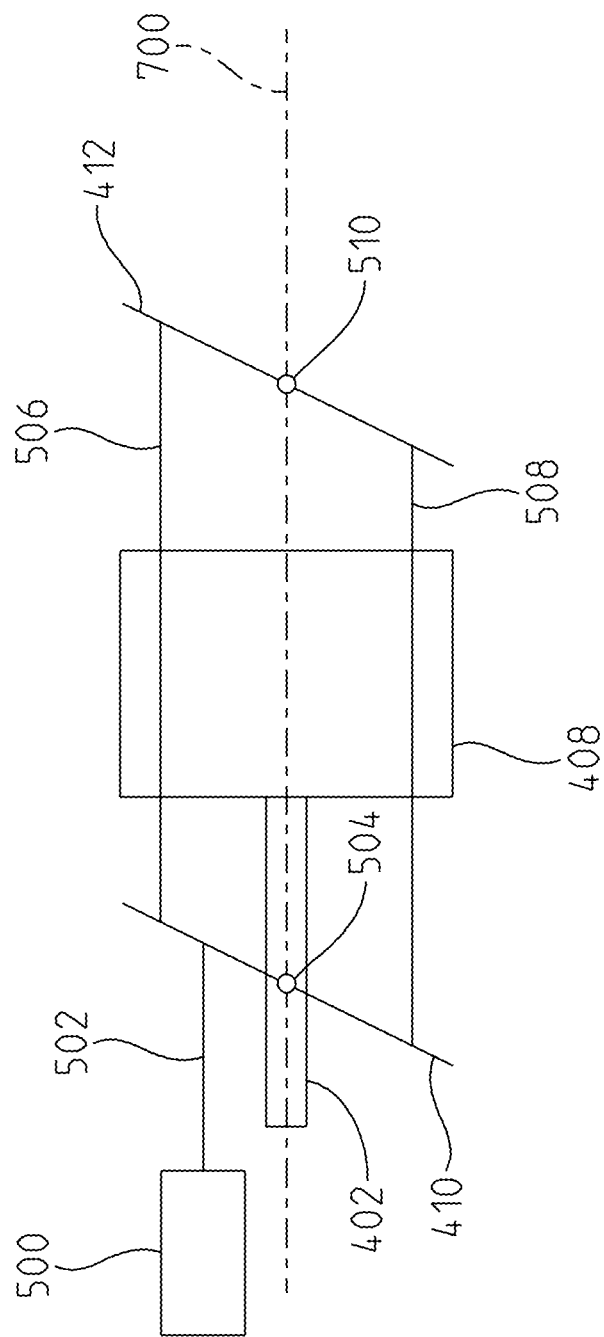
FIG. 7 is a third simplified schematic of the transmission assembly of FIG. 4.

The pivotal movement of the input plate 410 is shown in FIG. 7. Here, the actuator rod 502 extends and pivots the input plate 410 about the first pivot 504. In doing so, the input plate 410 can push against the first push rod 506 towards the output plate 412. The first push rod 506 can slide longitudinally relative to the barrel 408 upon being moved by the input plate 410. As the first push rod 506 pushes against the output plate 412, the output plate 412 pivots relative to the second pivot 510. The output plate 412 can pivot by approximately the same angle relative to the substantially upright or vertical orientation as the input plate 410 pivots. This pivotal movement of the output plate 412 causes the second push rod 508 to slide relative to the barrel 408 and come into contact with the input plate 410. The pivotal movement of the output plate 412 about the second pivot 510 induces a substantially concomitant pivotal motion of an output 600 of the transmission assembly 400 (see FIG. 6). The output 600 can be in the form of the output shaft 404 of FIG. 4. Alternatively, the output 600 can be part of the cutting tool holder 110. In this manner, the cutting tool holder 110 can be directly coupled to the output 600 of the transmission assembly 400 such that pivotal movement of the output plate 412 induces substantially concomitant pivotal movement of the cutting tool holder 110.

As previously described, the first push rod 506 and second push rod 508 can slide in a substantially longitudinal direction relative to the barrel 408 between the input plate 410 and output plate 412. In this way, the push rods tend to float within the barrel 408 and can retract back and forth into contact between the input plate 410 and the output plate 412 as the barrel 408 rotates about the input axis 700.

Stated another way, the actuator rod 502 can pivot the input plate 410 from the substantially upright or vertical orientation (e.g., see FIG. 5) to a desired angle. In a first position, the output damper 512 tends to bias the output plate 412 to the substantially upright or vertical orientation of FIG. 5. As the barrel rotates 90°, the pivoted input plate 410 contacts the first push rod 506 and second push rod 508, which slide relative to the barrel 408 and engage the output plate 412. As such, the push rods 506, 508 can pivot the output plate 412 about the second pivot 510 from the first position to an angled position. In the angled position, the output plate 412 is angularly disposed relative to the first position at an angle similar to that of the input plate 410. The angled position can correspond to a maximum displacement.

As the output plate 412 pivots to the angled position, the output 600 also pivots. As the barrel rotates another 90°, the output damper 512 can bias the output plate 412 back to the first position. Another 90° rotation of the barrel 408 can induce the output plate 412 to pivot back to the angled position. This reciprocal motion of the output plate 412 about the second pivot 510 can induce an oscillatory motion of the cutting tool holder 110 and cutting tool 112. Here, the second pivot 510 can correspond to the pivot point 114 of FIG. 1.

The amplitude and frequency of the cutting system can be adjusted by changing the output of the power device 102 (i.e., which adjusts the frequency) and adjusting the angle of the input plate 410 (which adjusts the amplitude). As the angle of the input plate 410 is adjusted, this induces the angle of the output plate 412 to further change which adjusts the oscillatory motion through the output 600 of the transmission assembly 400. Thus, the oscillatory cutting motion of the cutting tool 112 can be continuously adjusted by changing the angle at which the input plate 410 pivots relative to the first pivot 504.

In a system similar to that shown in FIG. 5, the distance by which the actuator rod 502 extends and pivots the input plate 410 can be controllable, so that any desirable amplitude can be achieved. As described above, a system controller may be capable of controlling this functionality of the actuator 500. The system controller may include a memory unit and processor. A set of instructions, such as software or control logic, can be stored in the memory unit and executed by the processor. In this manner, the amplitude and frequency can be automatically and continuously adjusted by the system controller.

The arrangement of the input shaft 402 and output shaft 404 of FIG. 4 is only one example of this transmission assembly 400. In other examples, the input and the output of the transmission assembly 400 may be configured in a way other than being substantially orthogonal to one another.

Figure 8:
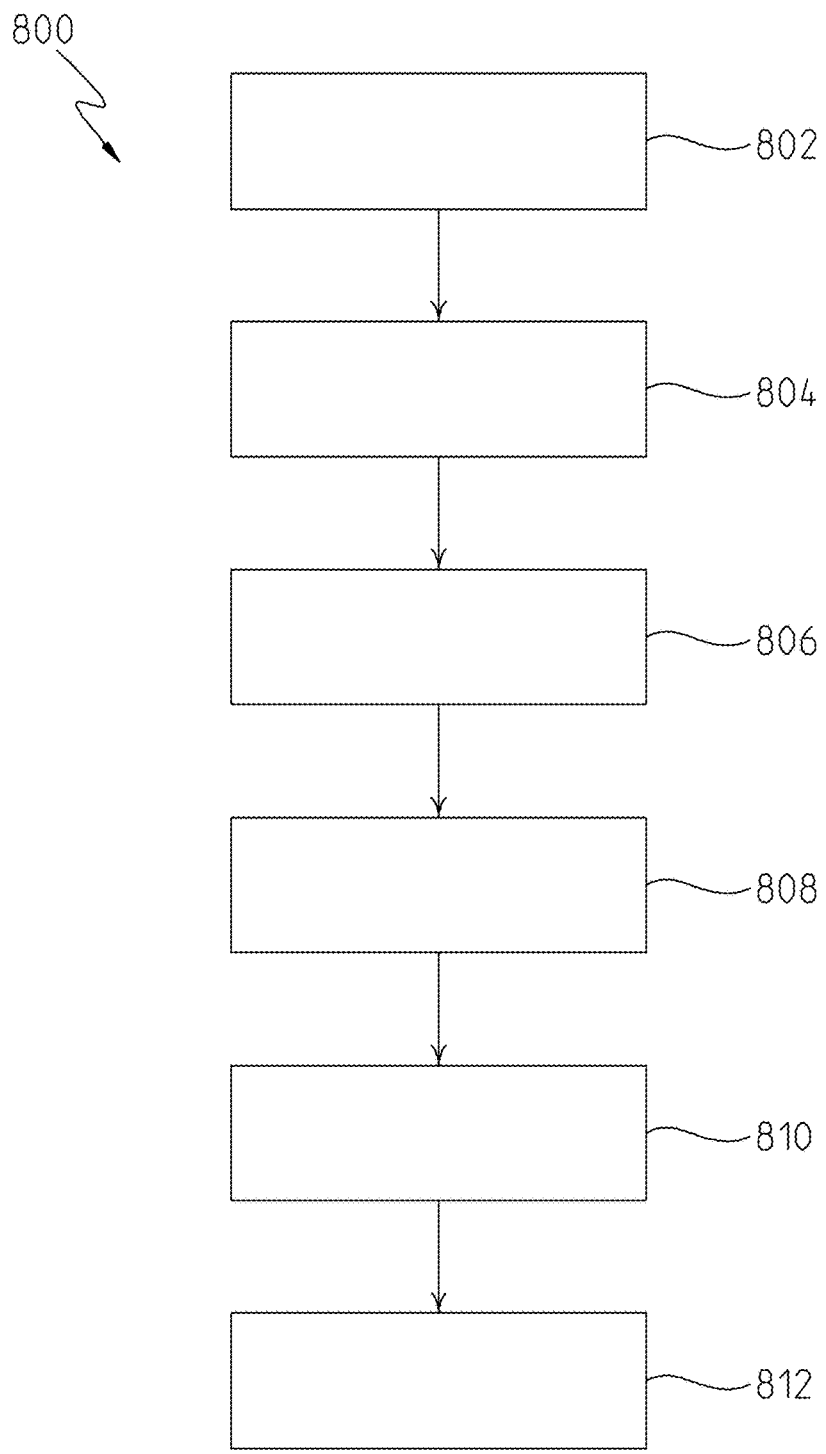
FIG. 8 is a block diagram of a method for cutting a wet green ceramic article with the system of FIG. 1.

In FIG. 8, one embodiment of a method 800 for cutting a wet green ceramic article is shown. The method 800 can include a plurality of blocks that are performed or executed by a cutting system, such as those previously described. For purposes of the method 800 shown in FIG. 8, reference will be made to the system 100 of FIG. 1.

In a first block 802, the output of the power device 102 can be set. This may include setting the output to a desired speed, power level, or the like. The output of the power device 102 can determine the frequency of the oscillatory motion of the cutting tool 112, and thus the result of block 802 can establish an initial frequency. The output of the power device 102, however, can be continuously adjusted to achieve a desired frequency, and therefore block 802 can be continuously executed during the cutting process.

Once the desired output is set, the method 800 advances to block 804 in which the power device 102 drives the input 106 of the transmission assembly 104. In the illustrated embodiment of FIG. 2, the input may include the drive gear, V-belt 216, driven gear 218, or a combination thereof. In the illustrated embodiment of FIG. 4, the input may include the input shaft 402 of the transmission assembly 400. As the power device 102 produces power, the power device 102 drives the input 106 of the transmission assembly 104.

As the input 106 of the transmission assembly 104 is driven by the power device 102, method 800 advances to block 806 in which the power is transferred through the transmission assembly 104 from the input 106 to the output 108. In the embodiment of FIG. 2, the output may include the flywheel 218, the crankshaft 220, the connecting rod 222, or a combination thereof. In the embodiment of FIG. 4, the output may include the output plate 412, the output shaft 404, the output 600, or a combination thereof. In any event, power received at the input 106 of the transmission assembly 104 is transferred to the output 108 thereof in block 806.

As the output 108 receives the power from the input 106, the method 800 advances to block 808 in which the cutting tool holder 110 and cutting tool 112 pivot about the pivot point 114. The output 108 of the transmission assembly 104 can reciprocate back and forth between a first position and a second position, and as it does the cutting tool 112 can oscillate about the pivot point 114 along an arc-like path in block 810.

The oscillatory motion of the cutting tool 112 includes an amplitude and frequency which can be adjusted in block 812 of the method 800. The frequency can be adjusted by adjusting the output from the power device 102 in block 802, whereas the amplitude can be adjusted by making adjustments in the transmission assembly 102 (e.g., adjusting the angle of the input plate 410 or adjusting the offset distance 310 of the crankshaft 220) or altering the structural connections of the output 108 to the cutting tool holder 110 relative to the pivot point 114 and cutting tool 112.

In other embodiments, the method 800 can include additional blocks that are executed for achieving a desired cutting operation. Alternatively, one or more of the blocks in FIG. 8 may be omitted to achieve desired results. In any event, FIG. 8 represents a single example of a method for achieving a desired cutting motion when cutting a wet green ceramic article.

EXAMPLE

As described above, the system of FIG. 1 can achieve an increased cutting speed. In particular, the oscillatory cutting motion of the cutting tool 112 can move at a higher speed and cut more material at a higher rate than other conventional cutting processes. As a result, there is a reduced force acting on the wet green ceramic article 118 during the cutting process and therefore less frictional smear occurs. This is further shown in the graphical illustration 1000 of FIG. 10. The graphical illustration 1000 highlights a relationship of the cutting motion of the cutting tool 112 referred to as the slice-push ratio. As the cutting tool 112 moves along the oscillatory cutting path 116, this movement has a horizontal component along direction 120 and a vertical component along direction 122. The slice push ratio is defined as a ratio of the downward push velocity or displacement of the cutting tool 112 compared to its horizontal velocity or displacement (i.e., a comparison between the velocity of the cutting tool 112 along direction 122 and the velocity along direction 120). A higher or greater slice-push ratio produces less force applied to the material and a better overall cut thereof.

Figure 10:
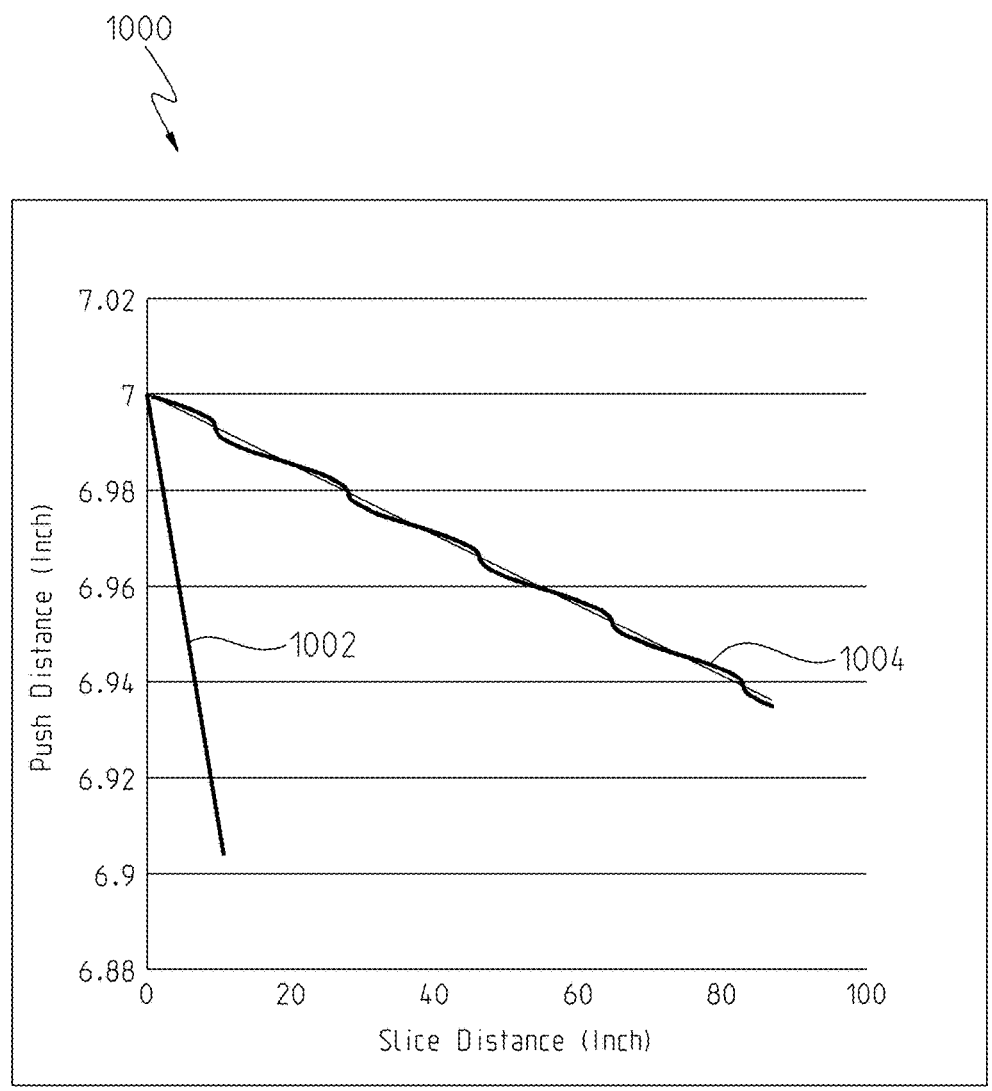
FIG. 10 is a graphical illustration of slice-push ratio of the system of FIG. 1 compared to a conventional band saw.

In the example of FIG. 10, a first curve 1002 represents a slice-push ratio of a conventional band saw and a second curve 1004 represents a theoretical slice-push ratio for an oscillatory cutting tool 112 of FIG. 1. As shown, the theoretical or model slice-push ratio achieved by the oscillatory cutting tool 112 is greater than the ratio achieved by the conventional band saw. In other words, as the cutting tool 112 moves along the oscillatory path 116, the horizontal or tangential component of this movement provides a slice-push ratio superior to the conventional band saw.

While exemplary embodiments incorporating the principles of the claimed disclosure have been disclosed hereinabove, the present disclosure is not limited to the disclosed embodiments. Instead, this disclosure is intended to cover any variations, uses, or adaptations of the claimed disclosure using its general principles. Further, this application is intended to cover such departures from the present disclosure as come within known or customary practice in the art to which the claimed disclosure pertains and which fall within the limits of the appended claims.

What is claimed is:

1. A system for cutting a wet green ceramic article, comprising:
   a power device to generate power;
   a transmission assembly comprising an input and an output, the input being operably coupled to the power device such that power is transferred through the transmission assembly from the input to the output; and
   a cutting tool holder to hold a cutting tool, the cutting tool holder coupled to the output and pivotally coupled to a pivot point;
   wherein the cutting tool comprises an elongated saw held between a first arm and a second arm of the cutting tool holder; and
   wherein the output of the transmission assembly pivots the cutting tool holder about the pivot point and induces the cutting tool to oscillate in a cutting motion between a first position and a second position;
   wherein the input comprises an input shaft operably coupled to the power device,
   wherein the input shaft rotates about an input axis;
   the output comprises an output shaft coupled to the cutting tool holder; and
   the transmission assembly further comprises:
   a barrel rotatably coupled to the input shaft such that rotation of the input shaft induces substantially concomitant rotation of the barrel about the input axis;
   a first push rod coupled to the barrel, where the first push rod rotates in a substantially concomitant manner with the barrel and reciprocally slides in a direction substantially parallel to the input axis;
   a second push rod coupled to the barrel, the second push rod being radially spaced from the first push rod, wherein the second push rod rotates in a substantially concomitant manner with the barrel and reciprocally slides in the direction substantially parallel to the input axis;
   a housing to at least partially surround the barrel, the first push rod, and the second push rod;
   an input plate positioned on one side of the barrel, the input plate being pivotally coupled to a first pivot;
   an actuator to pivotally move the input plate about the first pivot; and
   an output plate positioned on an opposite side of the barrel to the input plate, the output plate being pivotally coupled to a second pivot and coupled to the output shaft;
   wherein a pivotal movement of the input plate induces a corresponding substantially linear movement of the first push rod and second push rod, and wherein the substantially linear movement of the first push rod and second push rod induces a corresponding pivotal movement of the second plate.

2. The system of claim 1, wherein the cutting tool travels along an arcing path between the first position and the second position.

3. The system of claim 1, wherein the cutting motion of the cutting tool comprises an amplitude and a frequency, wherein the amplitude is adjustably controllable based on an angle at which the input plate is disposed and the frequency is adjustably controllable based on a rotational speed of the input shaft.

4. The system of claim 1, wherein, as the barrel rotates about the input axis, the output shaft induces the cutting tool to oscillate in the cutting motion between the first position and the second position.

5. The system of claim 1, wherein the elongated saw comprises at least one of a band saw and a coil saw.

6. The system of claim 1, wherein the system is configured to oscillate the cutting tool at 20 to 60 Hz.

7. The system of claim 1, wherein the cutting tool is spaced by a distance from the pivot point.

8. A system for cutting a wet green ceramic article, comprising:
   a power device for generating power;
   an input shaft operably coupled to the power device, wherein the input shaft is configured to rotate about an input axis;
   an output shaft;
   a barrel rotatably coupled to the input shaft such that rotation of the input shaft induces substantially concomitant rotation of the barrel about the input axis;
   a first push rod slidably coupled to the barrel, wherein the first push rod rotates in a substantially concomitant relationship with the barrel and slides in a direction substantially parallel to the input axis;
   a second push rod slidably coupled to the barrel, the second push rod being radially spaced from the first push rod, wherein the second push rod rotates in a substantially concomitant relationship with the barrel and slides in the direction substantially parallel to the input axis;
   an input plate positioned on one side of the barrel, the input plate being pivotally coupled to a first pivot;
   an output plate positioned on an opposite side of the barrel to the input plate, the output plate being pivotally coupled to a second pivot and to the output shaft; and
   a cutting tool coupled to the output shaft, wherein the cutting tool moves in an oscillatory motion between a first position and a second position as the output plate reciprocally pivots about the second pivot;
   wherein a pivotal movement of the input plate about the first pivot induces a substantially linear movement of the first push rod and second push rod, and the substantially linear movement of the first push rod and the second push rod induces a pivotal movement of the output plate about the second pivot.

9. The system of claim 8, further comprising an input damper and an output damper, the input damper adapted to bias the input plate to a substantially vertical orientation and the output damper adapted to bias the output plate to a substantially vertical orientation.

10. The system of claim 8, wherein the oscillatory motion of the cutting tool comprises an amplitude and a frequency, wherein the amplitude is adjustably controllable based on an angle at which the input plate is disposed and the frequency is adjustably controllable based on a rotational speed of the barrel.

11. The system of claim 8, wherein when the input plate is disposed in a substantially perpendicular orientation to the input axis, the first push rod and second push rod do not contact either the input plate or output plate.

12. The system of claim 8, further comprising:
an actuator comprising a member being movable between an extended position and a retracted position, wherein a movement of the member induces pivotal movement of the input plate about the first pivot, wherein the system controls the power device and the actuator and adjustably controls the movement of the member to pivot the input plate to a desired angle.

* * * * *